United States Patent
Melby et al.

(10) Patent No.: US 7,120,531 B1
(45) Date of Patent: Oct. 10, 2006

(54) METHOD OF DETERMINING A DEFAULT TRANSMISSION INPUT SPEED

(75) Inventors: Steve L. Melby, Howell, MI (US); Andrew D. Herman, Grand Blanc, MI (US); Kenneth M. Simpson, Swartz Creek, MI (US); David Allen Dues, Howell, MI (US); Hallett D. Breidenbach, West Bloomfield, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/365,302

(22) Filed: Mar. 1, 2006

Related U.S. Application Data

(63) Continuation-in-part of application No. 11/283,216, filed on Nov. 18, 2005.

(51) Int. Cl.
*G06F 7/00* (2006.01)

(52) U.S. Cl. .............................. 701/57; 701/51; 701/58; 701/63; 192/3.51

(58) Field of Classification Search .................. 701/51, 701/55, 56, 57, 58, 62, 63, 65, 67; 477/34, 477/77; 192/3.51, 3.54, 3.63
See application file for complete search history.

(56) References Cited

U.S. PATENT DOCUMENTS

| 4,779,490 | A  |   | 10/1988 | Milunas |         |
|-----------|----|---|---------|---------|---------|
| 4,843,915 | A  |   | 7/1989  | Sugimura|         |
| 4,896,569 | A  |   | 1/1990  | Ito     |         |
| 5,245,893 | A  | * | 9/1993  | Koenig et al. | 477/120 |
| 5,484,353 | A  | * | 1/1996  | Lux et al. | 477/169 |
| 5,778,329 | A  | * | 7/1998  | Officer et al. | 701/55 |
| 5,855,532 | A  |   | 1/1999  | Sugiyama|         |
| 6,564,133 | B1 |   | 5/2003  | Ebashi  |         |
| 6,746,367 | B1 | * | 6/2004  | Loeffler | 477/70 |
| 6,761,664 | B1 | * | 7/2004  | Ayabe et al. | 477/144 |
| 6,832,147 | B1 | * | 12/2004 | Vornehm et al. | 701/54 |
| 6,875,156 | B1 | * | 4/2005  | Steiger | 477/158 |

* cited by examiner

*Primary Examiner*—Richard M. Camby
(74) *Attorney, Agent, or Firm*—Paul L. Marshall

(57) ABSTRACT

A default value of transmission input speed in a motor vehicle powertrain having an automatic-shift multi-gear ratio power transmission is continuously updated based on a measured value of the input speed and other reliable speed data including transmission output speed and engine speed. The default value is substituted for the measured input speed when a malfunction of the input speed sensor is detected, and transitions back to the measured input speed when the input speed sensor malfunction is no longer present.

10 Claims, 6 Drawing Sheets

METHOD OF DETERMINING A DEFAULT TRANSMISSION INPUT SPEED

RELATED APPLICATIONS

This application is a continuation-in-part of co-pending U.S. patent application Ser. No. 11/283,216, filed Nov. 18, 2005, and assigned to the assignee of the present invention.

TECHNICAL FIELD

The present invention relates to electronic control of a motor vehicle powertrain, and more particularly to a method of determining a default value for the input speed of an automatic-shift multi-gear ratio power transmission in the event an input speed sensor malfunction.

BACKGROUND OF THE INVENTION

Reliable measurement or estimation of various parameters of a motor vehicle powertrain is essential to proper electronic control of the powertrain components. For example, automatic shifting of a multi-gear ratio power transmission requires a reliable measure or estimation of the transmission input speed. While the essential parameters are often measured with dedicated sensors, the control must include provisions for operation of the powertrain components in the event of sensor malfunctions. For example, if a transmission input speed sensor malfunctions during operation of the vehicle, the powertrain controller can respond by reverting to a "limp-home" control mode in which the transmission only operates in a specified gear ratio. Alternatively, it may be possible for the powertrain controller to reliably determine a default value for the transmission input speed based on other sensor data and provide normal or near-normal control of the transmission based on the default value. For example, the transmission input speed may be calculated based on measured vehicle speed or on measured transmission output speed and gear ratio if gear shifting is not in progress. However, it can be difficult to determine if the measured vehicle or transmission output speed signals are reliable, and knowledge of the transmission input speed is usually required during gear shifting for purposes of shift quality control. Accordingly, what is needed is a method of determining a reliable and continuously available default value of transmission input speed for use in powertrain control in the event of one or more speed sensor malfunctions.

SUMMARY OF THE INVENTION

The present invention provides an improved method of determining a default value of transmission input speed in a motor vehicle powertrain having an automatic-shift multi-gear ratio power transmission. The default input speed value is continuously updated based on the measured input speed and other reliable speed data including measured engine speed and transmission output speed. The default input speed value is available during shifting of the transmission and transitions to the measured input speed when the input speed sensor malfunction is no longer present.

DESCRIPTION OF THE PREFERRED EMBODIMENT

Figure 1:
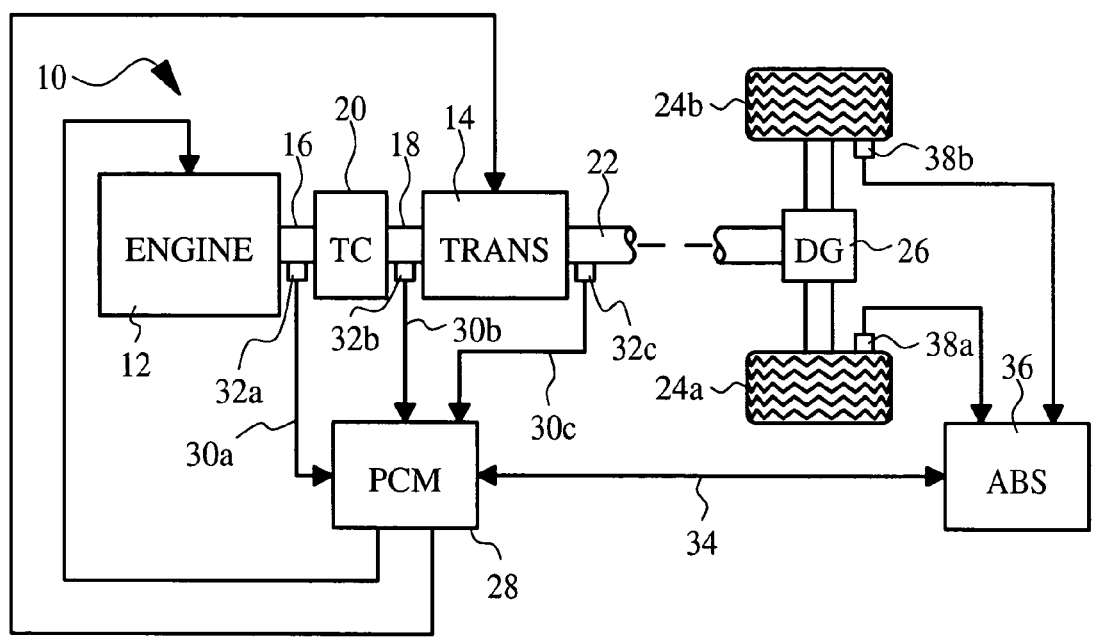
FIG. 1 is a diagram of a motor vehicle powertrain and a microprocessor-based powertrain control module (PCM) for carrying out the method of the present invention.

Referring to FIG. 1, the reference numeral 10 generally designates a motor vehicle powertrain including an internal combustion engine 12 and an automatic-shift multi-gear ratio power transmission 14. The engine output shaft 16 is coupled to the transmission input shaft 18 though a fluid coupling 20 such as a torque converter (TC), and the transmission output shaft 22 is coupled to drive wheels 24a, 24b through a differential gearset (DG) 26.

A microprocessor-based powertrain control module (PCM) 28 regulates various control functions of the powertrain 10 such as engine fuel delivery and transmission shifting based on a number of measured and estimated powertrain parameters. The measured powertrain signals depicted in FIG. 1 include an engine speed signal ES_SIGNAL on line 30a, a transmission input speed signal TIS_SIGNAL on line 30b and a transmission output speed signal TOS_SIGNAL on line 30c. The ES_SIGNAL is obtained from a speed sensor 32a responsive to the rotational speed of engine output shaft 16, the TIS_SIGNAL is obtained from a speed sensor 32b (referred to herein as the TIS sensor) responsive to the rotational speed of transmission input shaft 18, and the TOS_SIGNAL is obtained from a speed sensor 32c (referred to herein as the TOS sensor) responsive to the rotational speed of transmission output shaft 22. The PCM 28 obtains additional powertrain-related signals via a data bus 34 connected to other electronic modules of the vehicle. In the embodiment of FIG. 1, for example, the data bus 34 couples PCM 28 to an anti-lock brake system (ABS) controller 36. The ABS controller 36 determines a vehicle speed signal VS_SIGNAL based on data provided by wheel speed sensors 38a, 38b, and passes VS_SIGNAL and other parameters to PCM 28 via data bus 34.

One of the functions performed by PCM 28 is selecting a desired gear ratio for transmission 14, and initiating a shift to the desired gear ratio if necessary. Since transmission shift quality is controlled based in part on the transmission input speed signal TIS_SIGNAL provided by TIS sensor 32b, a malfunction of the TIS sensor 32b could result in poor shift quality unless PCM 28 detects the malfunction and determines a reliable default input speed value DEF_TIS to use in place of TIS_SIGNAL. For example, it is possible to calculate a default input speed value based on TOS_SIGNAL and the transmission gear ratio (TGR) so long as transmission shifting is not in progress. Alternatively, a default input speed value can be calculated from VS_SIGNAL, the gear ratio (DGR) provided by differential gearset 26 and transmission gear ratio TGR, again provided that transmission shifting is not in progress. However, it can be difficult to determine if VS_SIGNAL is reliable, and the transmission gear ratio TGR is not valid during shifting. Additionally, more than one speed sensor may malfunction at any given time. Accordingly, the present invention is directed to a method of determining a default input speed value DEF_TIS that is continuously available to PCM 28 in the event of one or more sensor malfunctions, and recovering from the default condition should the TIS sensor 32*b* begin to operate normally. If a reliable value of DEF_TIS cannot be determined due to multiple sensor failures, PCM 28 allows the transmission 14 to shift to a specified forward gear ratio ($3^{rd}$ gear, for example) for "limp-home" capability.

Figure 2A:
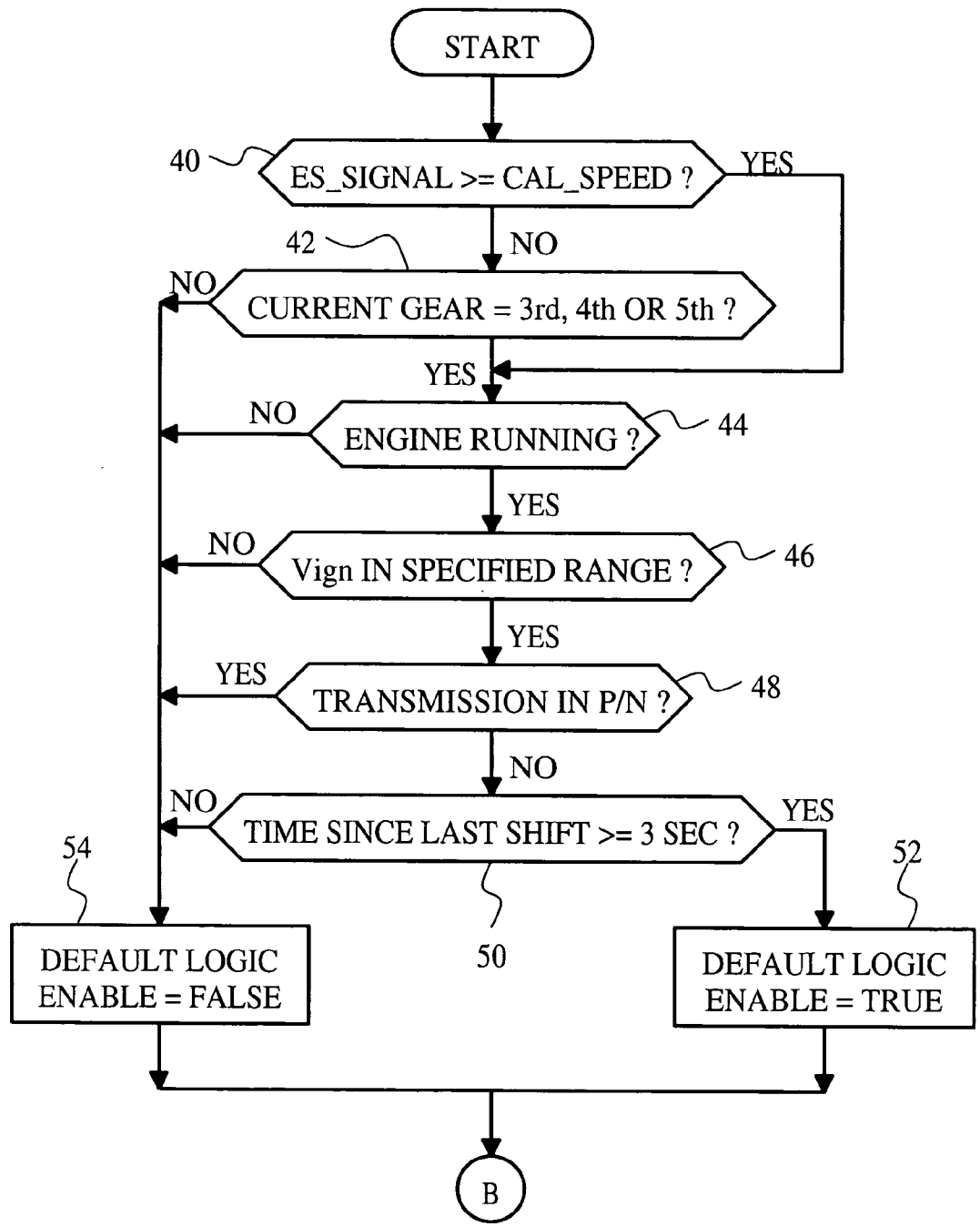
FIG. 2A is a flow diagram, which together with the flow diagrams of FIGS. 2B–2E, represent a software routine executed by the PCM of FIG. 1 according to this invention.

The flow diagrams of FIGS. 2A–2E depict a software routine periodically executed by PCM 28 for carrying out the method of the present invention. Referring to FIG. 2A, the blocks 40–50 define a series of entry conditions that must be met to enable use of the TIS default logic. To set the DEFAULT LOGIC ENABLE flag to True (block 52), the conditions defined by blocks 44, 46, 48 and 50 must be met in addition to the conditions defined by blocks 40 or 42. Thus, ES_SIGNAL must exceed a calibrated speed (CAL_SPEED) or the transmission 14 must be in $3^{rd}$, $4^{th}$ or $5^{th}$ gear, and the engine 12 must be running, the ignition voltage (Vign) must be within a specified range, the transmission 14 must not be in Park or Neutral, and the time since transmission shifting must be at least three seconds. If one or more of these conditions is not met, the block 54 sets the DEFAULT LOGIC ENABLE flag to False.

Figure 2B:
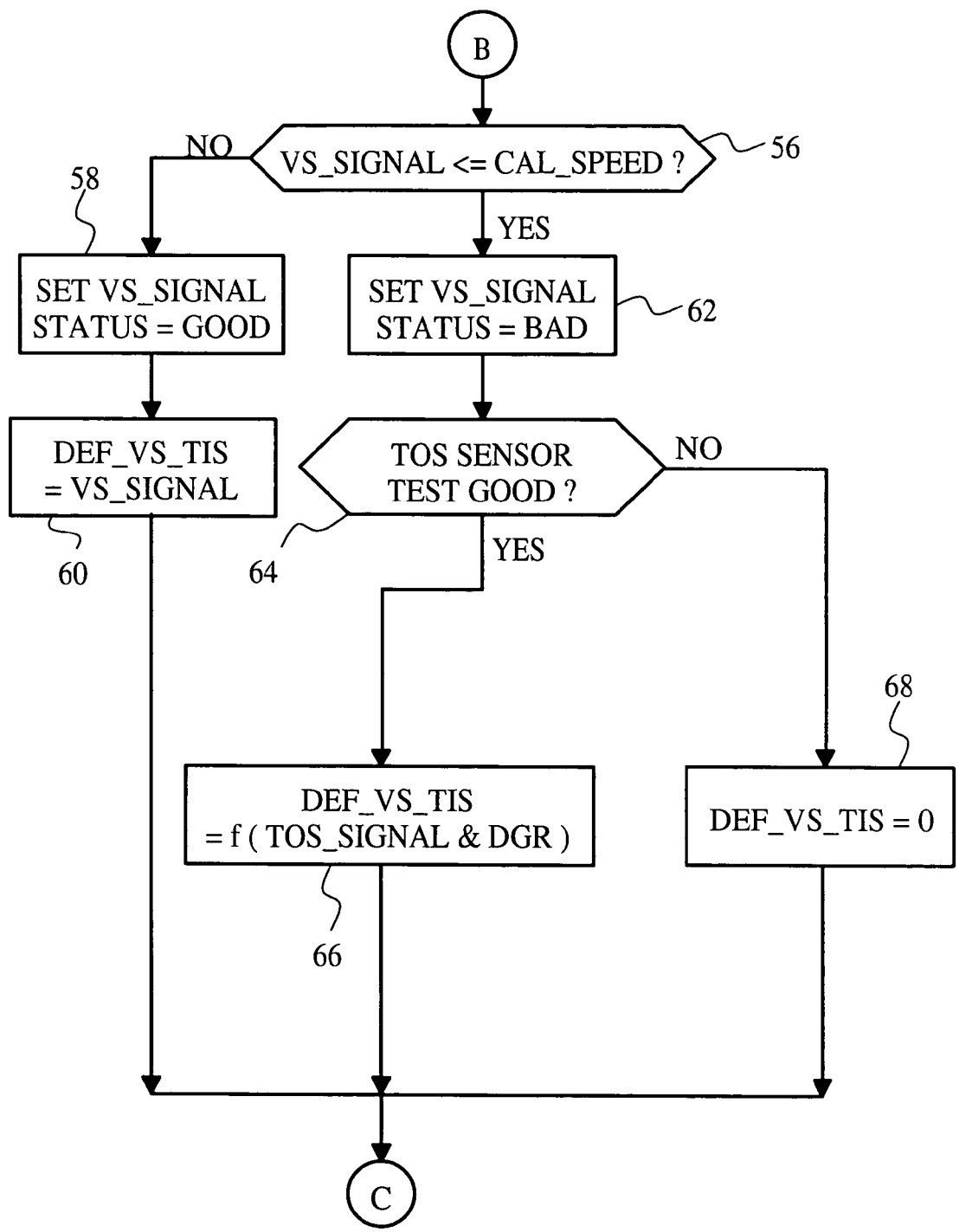
FIG. 2B is a flow diagram, which together with the flow diagrams of FIGS. 2A and 2C–2E, represent a software routine executed by the PCM of FIG. 1 according to this invention.

Referring to FIG. 2B, the blocks 56–68 then determine a vehicle speed value (DEF_VS_TIS) for purposes of determining the default transmission input speed DEF_TIS. This can be either the measured vehicle speed VS_SIGNAL or a calculated value of vehicle speed. Initially, block 56 determines if VS_SIGNAL exceeds a low speed threshold CAL_SPEED. If so, VS_SIGNAL is presumed to be reliable, and the blocks 58 and 60 are executed to set the VS_SIGNAL STATUS flag to GOOD and to set DEF_VS_TIS equal to VS_SIGNAL. However, if VS_SIGNAL≦CAL_SPEED, the block 62 sets the VS_SIGNAL STATUS flag to BAD, and block 64 determines if the TOS sensor 32*c* is operating properly based on diagnostic testing. If the TOS sensor 32*c* tests good, the block 66 calculates DEF_VS_TIS based on TOS_SIGNAL and the gear ratio (DGR) of differential gearset 26 as follows:

$$DEF\_VS\_TIS=TOS\_SIGNAL*DGR$$

If the TOS sensor 32*c* does not test good, the block 68 sets DEF_VS_TIS to zero.

Figure 2C:
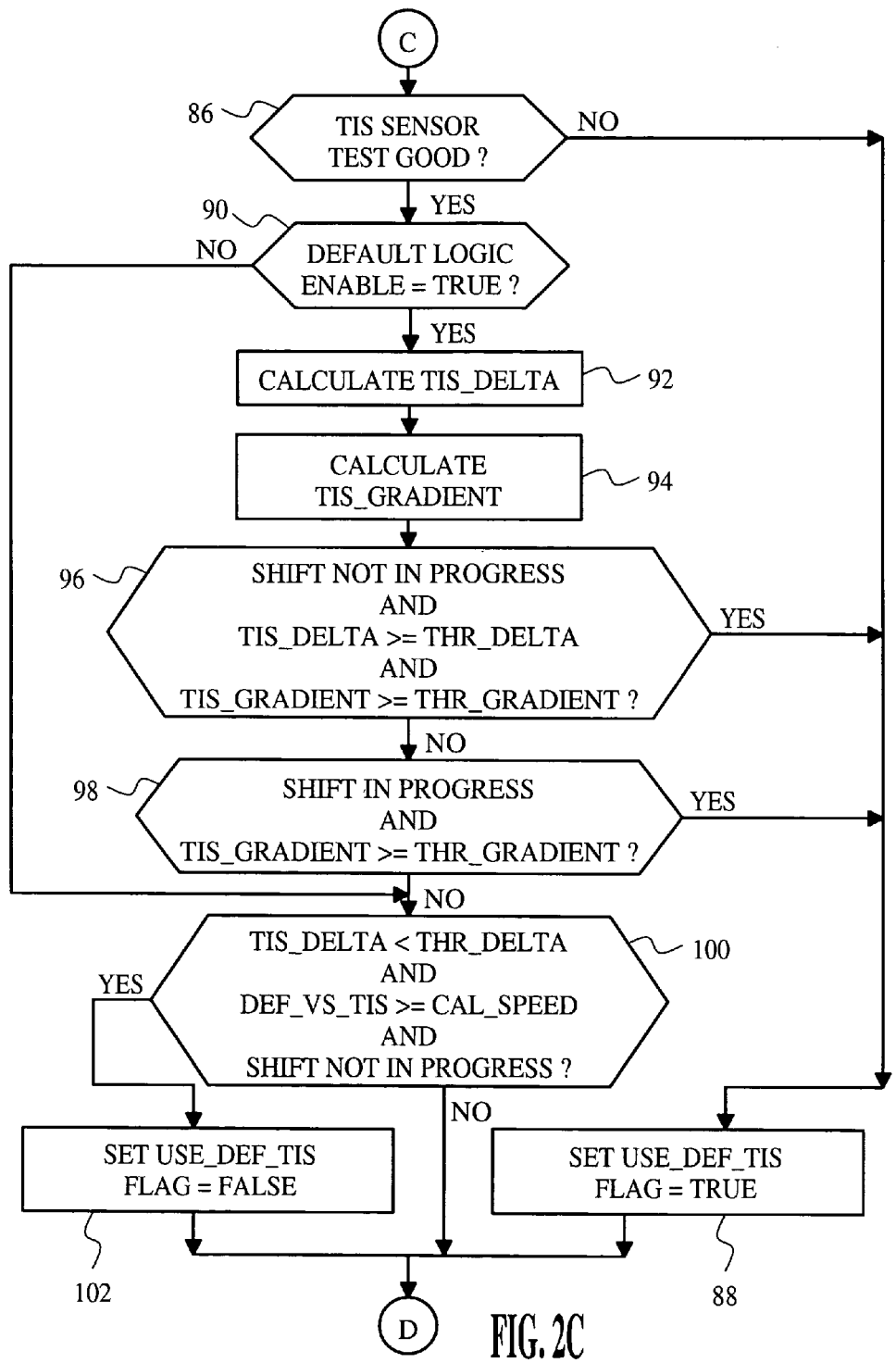
FIG. 2C is a flow diagram, which together with the flow diagrams of FIGS. 2A–2B and 2D–2E, represent a software routine executed by the PCM of FIG. 1 according to this invention.

Referring to FIG. 2C, the blocks 86–102 determine if the TIS sensor 32*b* has malfunctioned and should be replaced by a default value, and sets the state of the USE_DEF_TIS flag accordingly. The block 86 determines if the TIS sensor 32*b* is good based on diagnostic testing. If not, the block 88 sets the USE_DEF_TIS flag to TRUE, indicating that a default value should be substituted for TIS_SIGNAL. If the TIS sensor 32*b* does not test good, block 90 checks the status of the DEFAULT LOGIC ENABLE flag. If the DEFAULT LOGIC ENABLE flag is True, the blocks 92–98 are executed to determine if TIS_SIGNAL is otherwise reliable. The block 92 computes TIS_DELTA, the magnitude of a difference between TIS_SIGNAL and an input speed value calculated from TOS_SIGNAL. That is:

$$TIS\_DELTA=ABS[TIS\_SIGNAL-(TOS\_SIGNAL*TGR)]$$

where ABS signifies an Absolute Value function and TGR is the gear ratio provided by transmission 14. The block 94 calculates a gradient or time rate of change (TIS_GRADIENT) of the TIS_SIGNAL. If transmission shifting is not in progress, the block 96 compares TIS_DELTA and TIS_GRADIENT to respective threshold values THR_DELTA and THR_GRADIENT. Block 96 determines that TIS_SIGNAL is unreliable if TIS_DELTA exceeds the threshold THR_DELTA and TIS_GRADIENT exceeds the threshold THR_GRADIENT. In this event, block 88 is executed to set the USE_DEF_TIS flag to TRUE, indicating that a default value should be substituted for TIS_SIGNAL. If transmission shifting is in progress, block 98 simply compares TIS_GRADIENT to the threshold THR_GRADIENT since TIS_DELTA is not valid. If TIS_GRADIENT exceeds THR_GRADIENT, block 88 is likewise executed to set the USE_DEF_TIS flag to TRUE, indicating that a default value should be substituted for TIS_SIGNAL. If both blocks 96 and 98 are answered in the negative, block 100 is executed to determine if the USE_DEF_TIS flag should be cleared (i.e., set to FALSE). Block 100 causes block 102 to clear the USE_DEF_TIS flag if (1) TIS_DELTA is less than THR_DELTA, and (2) DEF_VS_TIS exceeds a calibrated speed CAL_SPEED, and (3) transmission shifting is not in progress.

Figure 2D:
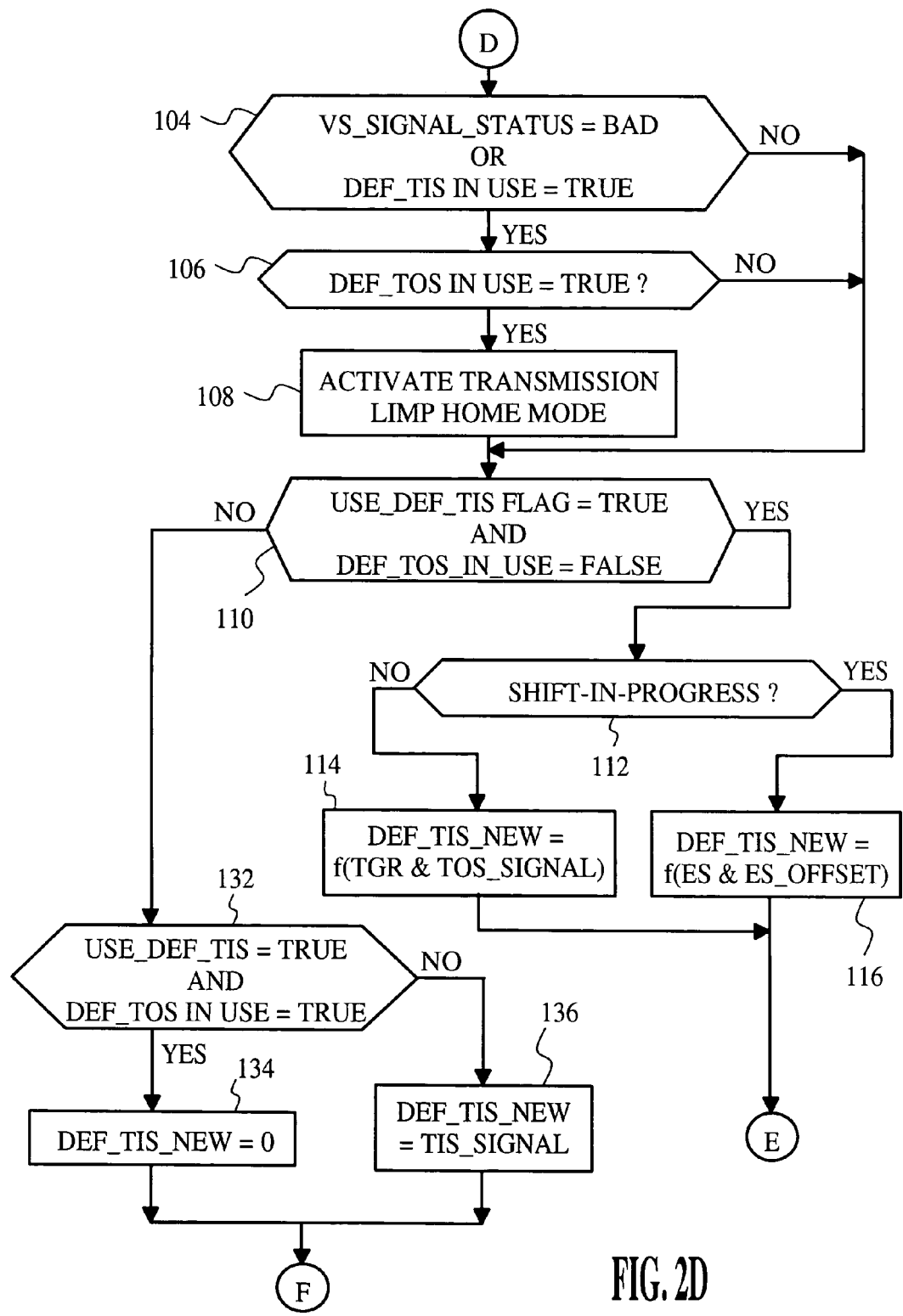
FIG. 2D is a flow diagram, which together with the flow diagrams of FIGS. 2A–2C and 2E, represent a software routine executed by the PCM of FIG. 1 according to this invention.
Figure 2E:
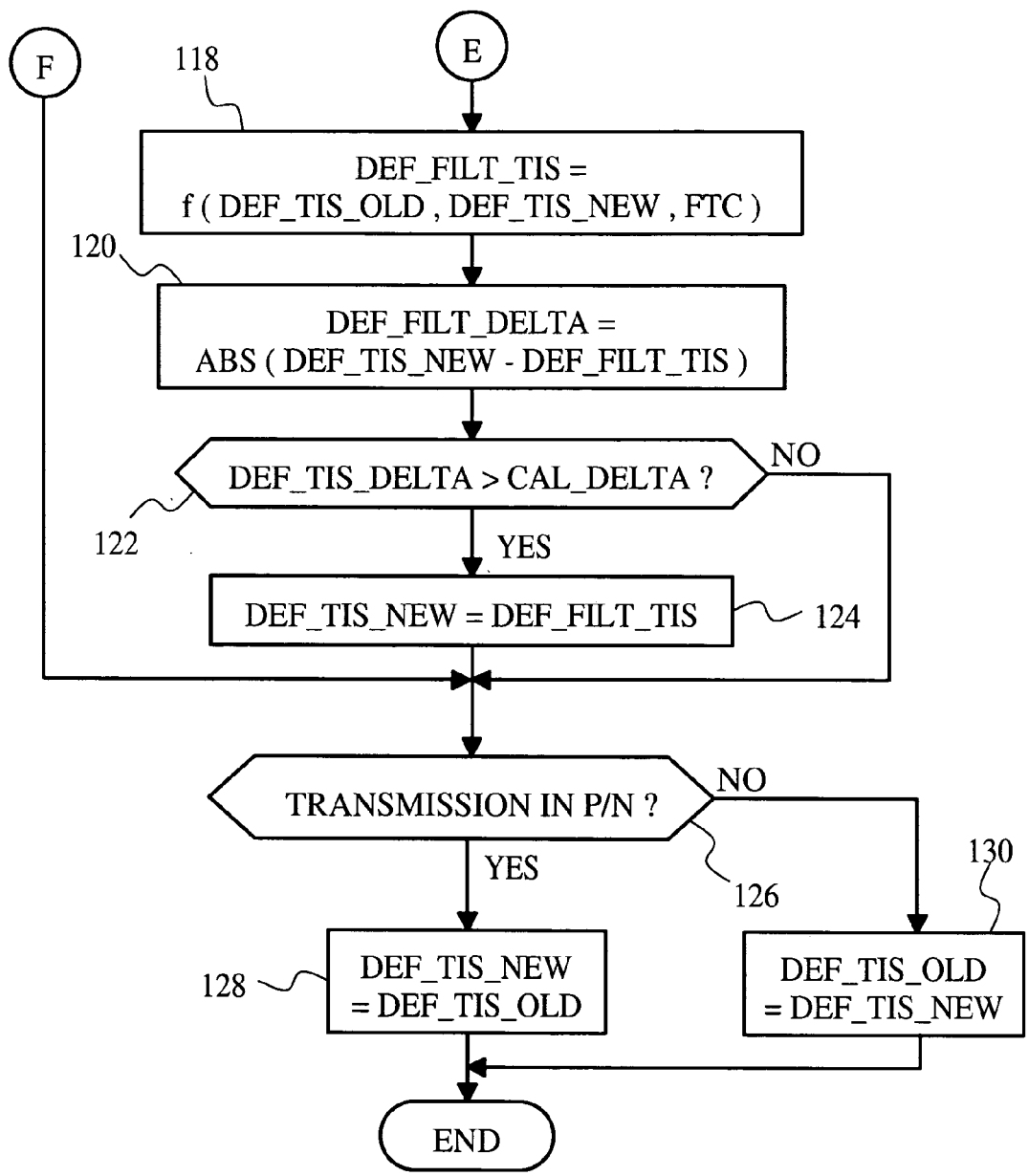
FIG. 2E is a flow diagram, which together with the flow diagrams of FIGS. 2A–2D, represent a software routine executed by the PCM of FIG. 1 according to this invention.

Referring to FIGS. 2D–2E, the blocks 104–106 determine if two or more of the speed signals TIS_SIGNAL, TOS_SIGNAL, VS_SIGNAL are unreliable. In this event, blocks 104 and 106 are both answered in the affirmative, and the block 108 activates a "limp-home" mode of transmission 14. The "limp-home" mode may vary from transmission to transmission. In some cases, it will merely entail a mechanical default mode in which a specified forward gear ratio such as $3^{rd}$ gear is engaged; in other cases, there may be limited electrically-initiated shifting in the "limp-home" mode.

In any event, the blocks 110–136 are then executed determine a new value (DEF_TIS_NEW) for the TIS default parameter. If block 110 determines that the USE_DEF_TIS flag is True (i.e., that a default TIS value should be used) and that TOS_SIGNAL is reliable, block 112 determines if transmission shifting is in progress. If shifting is not in progress, the transmission gear ratio TGR is valid, and the block 114 computes a new default value DEF_TIS_NEW based on the product of TOS_SIGNAL and TGR. If shifting is in progress, the block 116 computes a new default value DEF_TIS_NEW based on the measured engine speed ES and an offset value to account for slippage across the torque converter 20. The offset value may be obtained from a mathematical model of torque converter 20, or by table look-up based on various inputs such as the engine torque request and/or the type of shift (power-on vs. power-off, for example). The block 118 then calculates a low pass filtered version DEF_FILT_TIS of the default TIS value computed at blocks 114 or 116 using DEF_TIS_NEW, DEF_TIS_OLD and a filter time constant FTC, where DEF_TIS_OLD is a prior value of DEF_TIS_NEW. Blocks 120 and 122 then determine if the difference DEF_TIS_DELTA between DEF_TIS_NEW and DEF_FILT_TIS is greater than a calibrated difference CAL_DELTA. If so, the block 124 sets DEF_TIS_NEW equal to the filtered version DEF_FILT_TIS; if not, the default calculation of blocks 114 or 116 is used without filtering. Finally, the block 126 determines if the transmission 14 has been shifted to Park (P) or Neutral (N). If so, the block 128 uses the previous TIS default value (i.e., DEF_TIS_OLD) for DEF_TIS_NEW, completing the routine. Otherwise, the block 130 updates DEF_TIS_OLD according to the value of DEF_TIS_NEW determined at blocks 114, 116 or 124.

If block 110 of FIG. 2D is answered in the negative, the block 132 determines if both TOS_SIGNAL and TIS_SIGNAL are in default. If so, the block 134 sets DEF_TIS_NEW to zero; if not the block 136 sets DEF_TIS_NEW to TIS_SIGNAL. In either event, the blocks 126–130 of FIG. 2E are then executed as described above to determine if the transmission 14 has been shifted to Park (P) or Neutral (N), and to update DEF_TIS_NEW accordingly.

As demonstrated above, the TIS Default Logic of the present invention continuously updates the default value of transmission input speed DEF_TIS_NEW during vehicle operation so that if a sensor malfunction occurs, the powertrain control can continue without interruption even if transmission shifting is in progress, and even if VS_SIGNAL also becomes faulty. Additionally, the default value automatically transitions back to the measured value when TIS_SIGNAL becomes reliable once again.

While the present invention has been described with respect to the illustrated embodiment, it is recognized that numerous modifications and variations in addition to those mentioned herein will occur to those skilled in the art. For example, the VS_SIGNAL can be obtained from a different source than shown, and so on. Accordingly, it is intended that the invention not be limited to the disclosed embodiment, but that it have the full scope permitted by the language of the following claims.

The invention claimed is:

1. A default method of operation for a motor vehicle powertrain including an engine, an automatic shift power transmission, engine speed measuring apparatus, transmission input speed measuring apparatus, and transmission output speed measuring apparatus, the method comprising the step of:
    detecting a malfunction of the transmission input speed measuring apparatus;
    in response to a detected malfunction of the transmission input speed measuring apparatus, determining a default transmission input speed value based on an output speed signal produced by the transmission output speed measuring apparatus during a non-shifting mode of operation of said power transmission, and based on an engine speed signal produced by the engine speed measuring apparatus during a shifting mode of operation of said power transmission; and
    substituting said default transmission input speed value for an input speed signal produced by said transmission input speed measuring apparatus so long as a malfunction of said transmission input speed measuring apparatus is detected.

2. The method of claim 1, where the step of detecting a malfunction of the transmission input speed measuring apparatus includes the steps of:
    calculating an input speed value based on said vehicle speed signal; and
    so long as said transmission is not shifting, detecting a malfunction of said transmission input speed measuring apparatus if a difference between the calculated input speed value and said input speed signal exceeds a calibrated difference and a gradient of said input speed signal exceeds a calibrated gradient.

3. The method of claim 1, where the step of detecting a malfunction of the transmission input speed measuring apparatus includes the step of:
    detecting a malfunction of said transmission input speed measuring apparatus if a gradient of said input speed exceeds a calibrated gradient during shifting of said transmission.

4. The method of claim 1, including the steps of:
    detecting a recovery of the transmission input speed measuring apparatus; and
    substituting said input speed signal for said default transmission input speed value when recovery of said transmission input speed measuring apparatus is detected.

5. The method of claim 4, where the step of detecting a recovery of the transmission input speed measuring apparatus includes the steps of:
    calculating an input speed value based on said vehicle speed signal; and
    so long as said transmission is not shifting, detecting a recovery of the transmission input speed measuring apparatus if the output speed measuring apparatus is reliable and a difference between the calculated input speed value and said input speed signal is less than a calibrated difference.

6. The method of claim 1, where determining said default transmission input speed value based on said engine speed signal comprises the steps of:
    determining an engine speed offset based on one or more operating parameters of said powertrain; and
    adjusting said engine speed by said engine speed offset to determine said default transmission input speed.

7. The method of claim 6, wherein said engine speed offset is determined based on shift parameters of said transmission.

8. The method of claim 1, including the steps of:
    low pass filtering said default transmission input speed value;
    computing a difference between said default transmission input speed value and said filtered default transmission input speed value; and
    if the computed difference exceeds a calibrated difference, substituting said filtered default transmission input speed value for the input speed signal produced by said transmission input speed measuring apparatus so long as a malfunction of said transmission input speed measuring apparatus is detected.

9. The method of claim 1, including the steps of:
    determining if said input speed signal is reliable;
    determining if said output speed signal is reliable; and
    activating a limp-home mode of said transmission if neither of said input and output speed signals are reliable.

10. The method of claim 1, including the steps of:
    detecting a neutral or park condition of said transmission; and
    so long as said neutral or park condition is detected, setting said default transmission input speed value to a value of said default transmission input speed determined prior to such detection.

* * * * *